United States Patent
Mansour et al.

(10) Patent No.: US 12,556,970 B2
(45) Date of Patent: Feb. 17, 2026

(54) DYNAMICALLY ASSIGNING RESOURCE BLOCKS TO FACING SECTORS

(71) Applicant: T-MOBILE INNOVATIONS LLC, Overland Park, KS (US)

(72) Inventors: Nagi A. Mansour, Arlington, VA (US); Akin Ozozlu, McLean, VA (US)

(73) Assignee: T-MOBILE INNOVATIONS LLC, Overland Park, KS (US)

(*) Notice: Subject to any disclaimer, the term of this patent is extended or adjusted under 35 U.S.C. 154(b) by 430 days.

(21) Appl. No.: 18/178,230

(22) Filed: Mar. 3, 2023

(65) Prior Publication Data
US 2024/0298215 A1   Sep. 5, 2024

(51) Int. Cl.
*H04W 28/02* (2009.01)
*H04W 28/086* (2023.01)

(52) U.S. Cl.
CPC ... *H04W 28/0862* (2023.05); *H04W 28/0236* (2013.01)

(58) Field of Classification Search
CPC ......... H04W 28/0236; H04W 28/0862; H04W 28/0242; H04W 28/0205; H04W 28/0247; H04W 28/0289

USPC ........................................................... 370/329
See application file for complete search history.

(56) References Cited

U.S. PATENT DOCUMENTS

| | | | |
|---|---|---|---|
| 10,178,664 B1* | 1/2019 | Mansour | H04W 52/243 |
| 10,555,315 B1* | 2/2020 | Mansour | H04W 72/541 |
| 11,223,958 B1* | 1/2022 | Sahin | H04W 16/10 |
| 11,800,380 B1* | 10/2023 | Sung | H04L 27/2602 |
| 2012/0020309 A1* | 1/2012 | Malladi | H04W 72/0446 |
| | | | 370/329 |
| 2015/0181594 A1* | 6/2015 | Tsuda | H04W 72/0453 |
| | | | 370/329 |
| 2016/0309476 A1* | 10/2016 | Madan | H04W 28/0236 |
| 2017/0311181 A1* | 10/2017 | Furuichi | H04W 16/32 |
| 2022/0182166 A1* | 6/2022 | Fan | H04L 5/0023 |

* cited by examiner

*Primary Examiner* — Robert J Lopata

(57) ABSTRACT

A wireless communication network includes base stations serving cells. A first sector of a first cell served by a first base station is facing a second sector of a second cell served by a second base station. A controller receives performance data for each of the facing cells and dynamically assigns resource blocks to each base station. The base stations use the assigned resource blocks in the facing sectors to maximize allocation to user devices served in the facing sectors while minimizing interference. The controller may analyze the performance data over time and dynamically update the assigned resource blocks to each base station for the facing sectors at various time periods based on the analysis.

20 Claims, 8 Drawing Sheets

DYNAMICALLY ASSIGNING RESOURCE BLOCKS TO FACING SECTORS

TECHNICAL BACKGROUND

In wireless communication networks, base stations are located geographically to serve user devices located in the geographic area (i.e., the cell) served by the base station. The base stations allocate resource blocks to each user device that are used to communicate with the base station for transmission of information on the wireless communication network. To avoid interference, the resource blocks are allocated to user devices by the base station so that multiple devices are not using the same resource blocks within the cell.

While a single base station does not allocate resource blocks to multiple user devices that conflict, interference occurs when nearby base stations allocate resource blocks to user devices that conflict with resource blocks allocated to other, nearby user devices. Accordingly, improvements are needed to reduce the interference.

TECHNICAL OVERVIEW

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a wireless communication system. The system includes a first base station serving first user devices in a first cell having a first set of sectors. The system also includes a second base station serving second user devices in a second cell having a second set of sectors. The system also includes a controller that has one or more processors, and a memory with instructions that can be executed to cause the processors to perform dynamic resource block assignment to the base stations. The dynamic resource block assignment may include the processors of the controller determining a sector of the first base station is facing a sector of the second base station. The processors can receive performance data for the facing sectors from the respective base stations and dynamically assign a first portion of available resource blocks to the first base station for allocation to the first user devices in the first sector and a second portion of the available resource blocks to the second base station for allocation to the second user devices in the second sector based on the performance data. Other embodiments of this aspect include corresponding computer systems, apparatus, and computer programs recorded on one or more computer storage devices, each configured to perform the actions of the methods.

Implementations may include one or more of the following features. Optionally, the processors may calculate the first portion of the resource blocks for the first base station and the second portion of the resource blocks for the second base station to (1) maximize allocation of the available resource blocks to the user devices in each facing sector, and (2) maximize the performance data (i.e., minimize interference).

Optionally, the processors continuously receive the performance data and update the dynamic assignment of the resource blocks continuously based on the continuously received performance data. Optionally, the processors may analyze the performance data over time to calculate values for the first portion and values for the second portion at given temporal designations, store the values associated with the given temporal designations, and dynamically assign the values for the first portion to the first base station and the values for the second portion to the second base station at the given temporal designations. Optionally, at a given temporal designation the processors may retrieve the values associated with the given temporal designation, receive current performance data for each of the facing sectors, adjust the values associated with the given temporal designation based on the current performance data, and dynamically assign the adjusted values to the base stations.

Optionally, the portion of the resource blocks for the first base station does not overlap the portion of the resource blocks for the second base station. Optionally, the portion of the resource blocks for the first base station does overlap the portion of the resource blocks for the second base station.

Optionally, the performance data may include interference measurements, power measurements, timing measurements, or a combination thereof.

Optionally, the first base station may include a processor and a memory storing instructions that upon execution cause the processor to receive the assignment of the first portion of the available resource blocks, and allocate a first set of the first portion of the resource blocks to a first user device located in the first sector. The first base station may also include a wireless transceiver that exchanges signals with the first user device using the first set of resource blocks. Implementations of the described techniques may include hardware, a method or process, or computer software on a computer-accessible medium.

This Overview is provided to introduce a selection of concepts in a simplified form that are further described below in the Detailed Description. This Overview is not intended to identify key features or essential features of the claimed subject matter, nor is it intended to be used as an aid in determining the scope of the claimed subject matter.

While multiple embodiments are disclosed, still other embodiments of the present technology will become apparent to those skilled in the art from the following detailed description, which shows and describes illustrative embodiments of the invention. As will be realized, the technology is capable of modifications in various aspects, all without departing from the scope of the present invention. Accordingly, the drawings and detailed description are to be regarded as illustrative in nature and not restrictive.

DESCRIPTION OF THE DRAWINGS

Many aspects of the disclosure can be better understood with reference to the following drawings.

Figure 1:
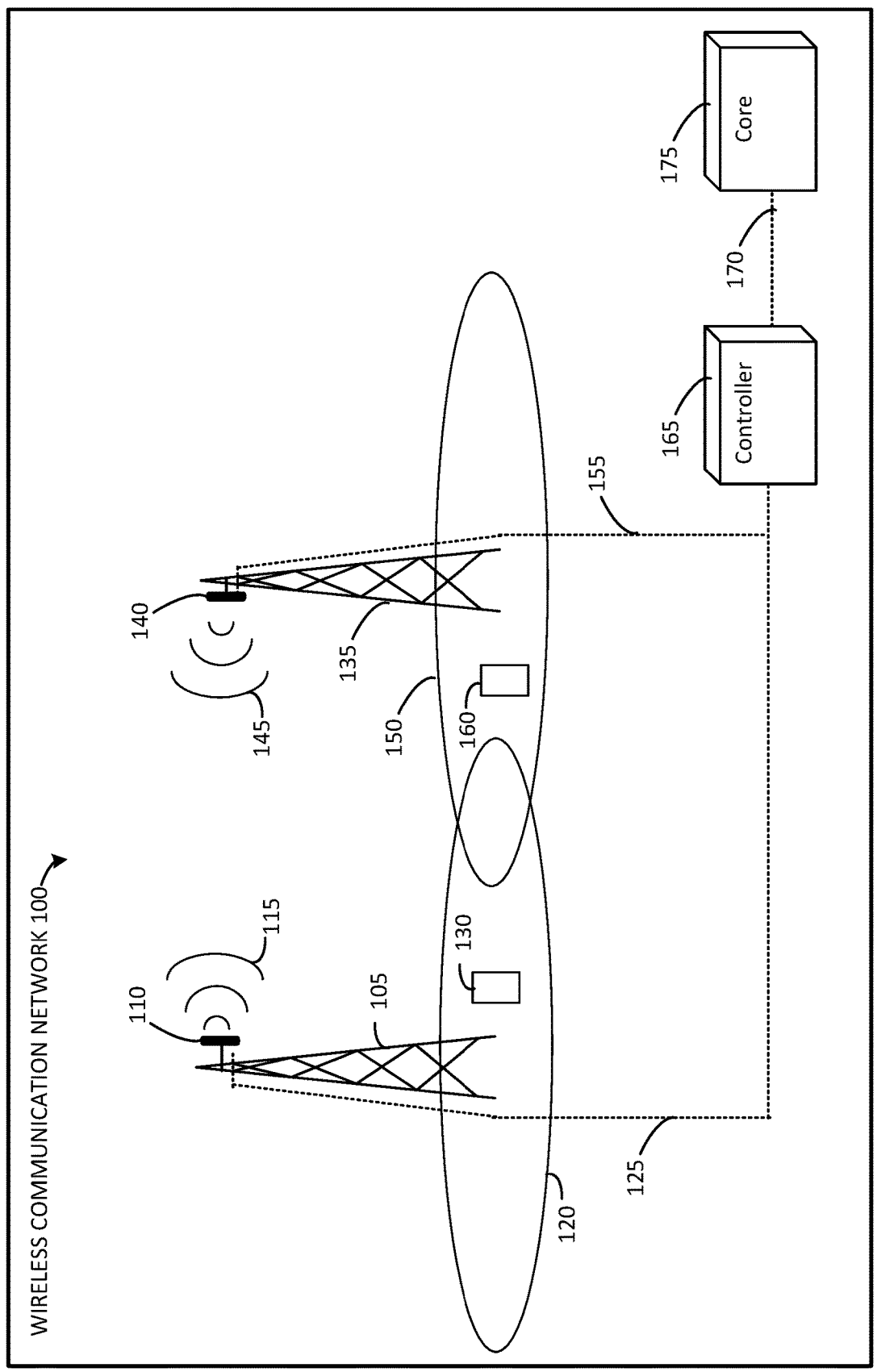
FIG. 1 illustrates a wireless communication network, according to some embodiments.

The drawings have not necessarily been drawn to scale. Similarly, some components or operations may not be separated into different blocks or combined into a single block for the purposes of discussion of some of the embodiments of the present technology. In the drawings, like reference numerals designate corresponding parts throughout the several views. While several embodiments are described in connection with these drawings, the disclosure is not limited to the embodiments disclosed herein. Moreover, while the technology is adaptable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Interference can reduce the performance of a wireless communication network for the user devices, the base stations, and the wireless communication network generally. In wireless communication networks, base stations are geographically located to serve user devices that are located within the cell served by the base station. Cells are the land area served by the base station, which includes a transceiver for receiving and sending wireless signals to the user devices. In an ideal network, the base stations are located geographically so that all land area is covered by a cell, and no cells overlap. In reality, however, base stations are not located so exactly, and other obstacles may interfere with signals. Accordingly, some land areas are "dead zones," having no coverage by a cell of a base station, and other areas have overlapping coverage by more than one cell and base station. Additionally, the base stations transmit signals that may travel further than the intended boundary of the cell.

A cell of a base station may have multiple sectors. For example, the base station may include multiple transceivers, each with an antenna pointed in a different direction, and each transceiver may serve one sector of the cell. In other examples, the cell may be broken into sectors in other ways. Resource blocks are used by devices in the wireless network to communicate. Each resource block is a given time and frequency during and at which the user device and base station may communicate with each other, and at which time and frequency they know to listen for the signals transmitted by the other. Each sector may have a number of resource blocks that can be allocated to user devices for communication. The base station allocates the resource blocks to the user devices to avoid interference with other user devices served by the base station.

One type of interference is caused when the base stations of two facing sectors (e.g., overlapping, with transceivers transmitting toward each other, or both) allocate the same resource blocks to user devices within their respective sectors. When this happens, the user device and base station of the first sector transmit signals that conflict with the signals transmitted by the user device and base station of the second sector.

One way to address this issue is to statically assign resource blocks to each sector that do not conflict. For example, if the channel bandwidth allows for ninety resource blocks per sector, one may be assigned no resource blocks and the other may be assigned all ninety resource blocks. As another example, one may be assigned the first forty-five resource blocks and the other may be assigned the second forty-five resource blocks. While this avoids the interference described above, it may not be the most optimal solution. Assigning resource blocks dynamically according to current conditions provides a more optimal solution.

As described in more detail below, a controller may dynamically assign the resource blocks to each base station for the facing sectors. The controller may base the assignment on performance data from each of the facing sectors to maximize performance of the wireless communication network for the facing sectors and maximize allocation of the resource blocks for the user devices in each of the facing sectors. For example, if more user devices are in the first sector than the second sector, the first sector may receive more resource blocks to allocate to the user devices in its sector to maximize allocation. Further, one base station may have lower performance due to a number of reasons including obstacles in the cell, weather, other activity, malfunctioning equipment, or any other reason.

The performance data used to dynamically assign the resource blocks may be obtained and analyzed over time to identify trends that occur at given days of the week, time of the day, or the like. For example, traffic patterns may impact performance data so that at given days of the week or times of the day different assignments of the resource blocks to each of the base stations for the facing sectors is most optimal.

Using a controller to dynamically assign resource blocks to base stations for facing sectors improves the performance of the wireless communication network by reducing the interference experienced by user devices in the given facing sectors and the respective base stations while maximizing allocation of resource blocks to the impacted user devices. With the reduced interference, less processing is needed on both the user devices and the base stations because the devices do not receive as many corrupted (e.g., interference filled) signals. This reduces the processing associated with receiving a signal that includes interference and cannot be properly processed, attempting to process the signal and failing, and retransmitting or reprocessing the signal after receiving the retransmission.

Turning now to the figures, FIG. 1 illustrates a wireless communication network 100. Wireless communication network 100 may support third generation (3G), fourth generation (4G), long term evolution (LTE), fifth generation new radio (5GNR), or any other network protocol standard of communication or radio access technology. Wireless communication network 100 includes base station 105, base station 135, controller 165, and core 175. While only two base stations 105 and 135 are shown, wireless communication network 100 may include any number of base stations.

Base station 105 and base station 135 may be any wireless access point including a gNodeB (gNB), eNodeB (eNB), NodeB (NB), NB-Internet of Things (NB-IoT) access node, low power wide area network (LP-WAN) base station, wireless relay, or any other wireless network transceiver. Base stations 105 and 135 may be the same type of wireless access point or different types of wireless access points. Base stations 105 and 135 may include antennas, amplifiers, filters, modulation, analog/digital interfaces, processors, software, memories, transceivers, bus circuitry, and the like not shown here for ease of description. An exemplary base station 700 is depicted and described with respect to FIG. 7.

Base station 105 includes a transceiver 110 that transmits and receives signals 115 communicated with user device 130 in cell 120 served by the base station 105. Further, base station 105 communicates with controller 165 and core 175 using backhaul link 125. Base station 135 includes a transceiver 140 that transmits and receives signals 145 communicated with user device 160 in cell 150 served by base station 135. Base station 135 communicates with controller 165 and core 175 using backhaul link 155.

Transceiver 110 may be any transceiver including processing circuitry and an antenna for transmitting and receiving signals 115 to communicate with user device 130 and any other user devices in cell 120. Transceiver 140 may be any transceiver including processing circuitry and an antenna for transmitting and receiving signals 145 to communicate with user device 160 and any other user devices in cell 150. While a single transceiver 110 is shown, base station 105 may include multiple transceivers 110, and each transceiver 110 may serve a sector of cell 120 in some embodiments. Further, while a single transceiver 140 is shown, base station 135 may include multiple transceivers 140, and each transceiver 140 may serve a sector of cell 150 in some embodiments.

Cell 120 may be the land area served by base station 105. Cell 150 may be the land area served by base station 135. In some embodiments, cell 120 and cell 150 may each be divided into sectors. In some embodiments, the sectors are served by a respective transceiver (e.g., transceiver 110 or transceiver 140) or antenna. Base station 105 allocates a number of resource blocks to each user device 130 once the user device 130 has selected cell 120 for communication. Base station 135 allocates a number of resource blocks to each user device 160 once the user device 160 has selected cell 150 for communication. Each user device 130 and user device 160 uses the allocated resource blocks to exchange communication signals 115 and communication signals 145, respectively, with the base station 105 and base station 135, respectively, via the transceiver 110 and transceiver 140, respectively. When a cell includes multiple sectors, each sector has a number of resource blocks that are assigned to the sector for allocation to the user devices in the sector. As will be shown and described in more detail with respect to FIG. 2, cell 120 overlaps cell 150, and a sector of cell 120 faces a sector of cell 150.

User device 130 and user device 160 may be any user device such as a smart phone, tablet, smart watch, laptop, or any other computing device that includes wireless communication circuitry for connecting to the wireless communication network 100 via a base station (e.g., base station 105 and base station 135). While only one user device 130 is shown in cell 120 and only one user device 160 is shown in cell 150 for simplicity, any number of user devices may be served by base station 105 in cell 120 and base station 135 in cell 150.

Base station 105 may use backhaul link 125 to communicate with controller 165 and core 175, and base station 135 may use backhaul link 155 to communicate with controller 165 and core 175. Backhaul link 125 and backhaul link 155 may use metallic links, glass fibers, radio channels, or some other communication media. Backhaul link 125 and backhaul link 155 may use IEEE 802.3 (Ethernet), Time Division Multiplex (TDM), Data Over Cable System Interface Specification (DOCSIS), Internet Protocol (IP), General Packet Radio Service Transfer Protocol (GTP), 5GNR, LTE, Wi-Fi, virtual switching, inter-processor communication, bus interfaces, some other data communication protocol, or a combination thereof.

Controller 165 may be a controller capable of providing instructions and information to multiple base stations including base station 105 and base station 135. Controller 165 may include processors and memory with software for analyzing performance data assigning resource blocks to the base stations, including base station 105 and base station 135, to mitigate interference as described in more detail with respect to the following figures.

Core 175 may include multiple network elements that are clustered together to provide functionality such as user plane function, access and mobility management function, network slice selection function, session management function, and others. Controller 165 communicates with core 175 through backhaul link 170. In some embodiments, controller 165 relays communications from base stations 105, 135 to core 175 using backhaul link 170. In some embodiments, controller 165 is part of core 175. Backhaul link 170 may use metallic links, glass fibers, radio channels, or some other communication media. Backhaul link 170 may use IEEE 802.3 (Ethernet), Time Division Multiplex (TDM), Data Over Cable System Interface Specification (DOCSIS), Internet Protocol (IP), General Packet Radio Service Transfer Protocol (GTP), 5GNR, LTE, Wi-Fi, virtual switching, inter-processor communication, bus interfaces, some other data communication protocol, or a combination thereof.

In use, base station 105 and base station 135 serve user devices, including user device 130 and user device 160, respectively. While serving the user devices, base station 105 and base station 135 measure performance data including interference measurements, retransmission measurements, timing measurements, power measurements, and the like. Further base station 105 may receive performance data information from the user devices being served in cell 120 including user device 130, and base station 135 may receive performance data information from the user devices being served in cell 150 including user device 160. Base station 105 may transmit its performance data and user device performance data it receives to controller 165 over backhaul link 125. Base station 135 may transmit its performance data and user device performance data it receives to controller 165 over backhaul link 155. Controller 165 may determine that a sector of cell 120 faces or overlaps a sector of cell 150. Controller 165 may assign, based on the performance data, resource blocks to each base station 105 and base station 135 to minimize interference and maximize allocation of resource blocks to the user devices in each of the facing sectors, as described in more detail in the following figures. Controller 165 may transmit the assignment of the resource blocks to base station 105 via backhaul link 125 and to base station 135 via backhaul link 155. As other user devices select the sector of cell 120 with the first assignment of resource blocks, base station 105 allocates resource blocks from the assigned resource blocks to the user devices for exchanging signals between the user devices and the base station 105. Similarly, as other user devices select the facing sector of cell 150 with the second assignment of resource blocks, base station 135 allocates resource blocks from its assigned resource blocks to the user devices for exchanging signals between the user devices and the base station 135.

Figure 2:
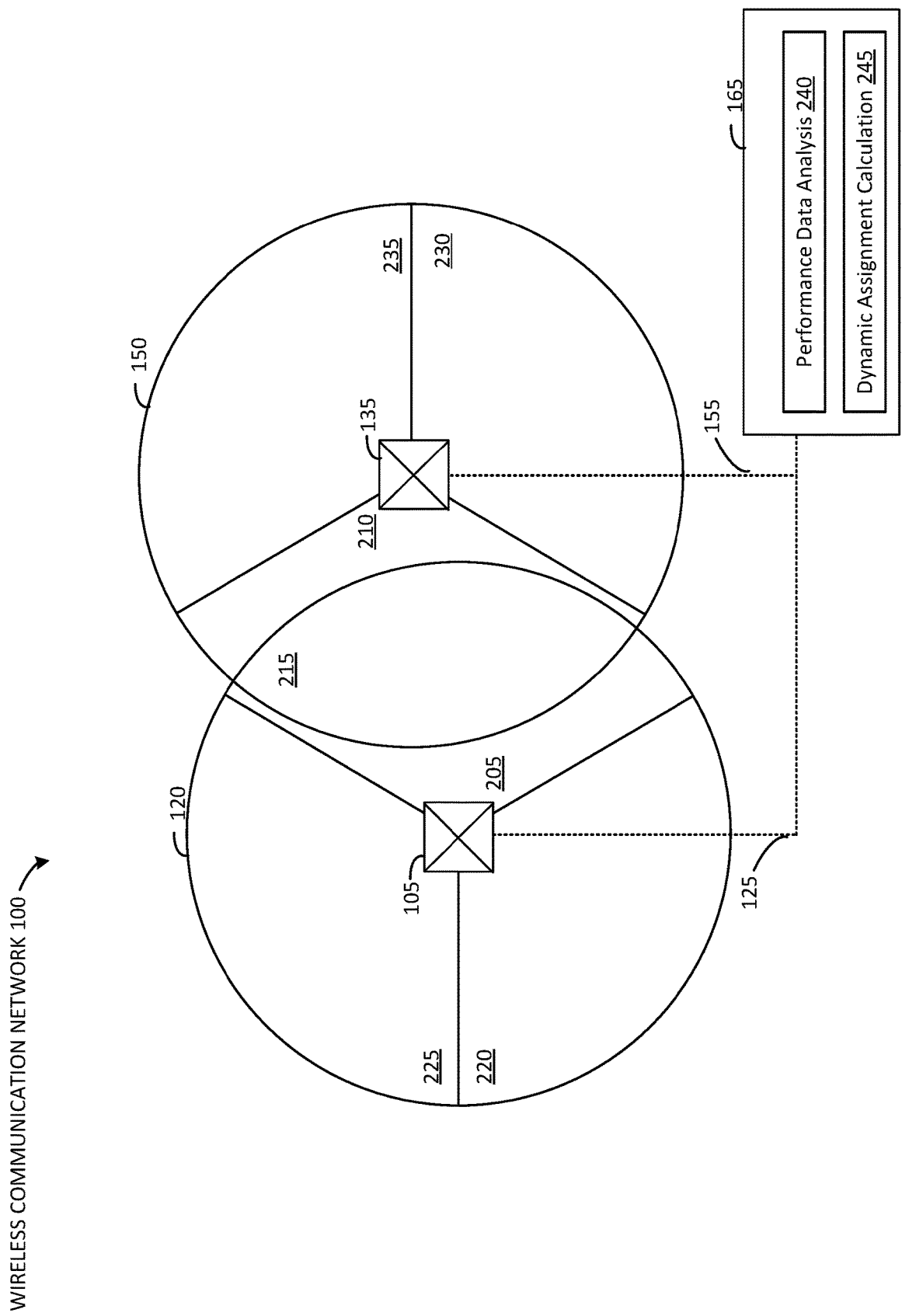
FIG. 2 illustrates a top-down view of sectors of cells in a wireless communication network that includes facing sectors, according to some embodiments.

FIG. 2 illustrates a top-down view of wireless communication network 100. From this view, within wireless communication network is seen base station 105 and its corresponding cell 120 and base station 135 and its corresponding cell 150. Also shown is controller 165 and backhaul link 125 between controller 165 and base station 105 as well as backhaul link 155 between controller 165 and base station 135.

Further as seen from this view, cell 120 includes sector 205, sector 220, and sector 225. In some embodiments, base station 105 may include multiple transceivers (e.g., including transceiver 110), each facing in a different direction so that one creates sector 205, one creates sector 220, and one creates sector 225. Similarly, cell 150 includes sector 210, sector 230, and sector 235. In some embodiments, base station 135 may include multiple transceivers (e.g., including transceiver 140), each facing in a different direction so that one creates sector 210, one creates sector 230, and on creates sector 235. Each sector is assigned resource blocks to allocate to user devices (not shown) that are connected to the wireless communication network 100 for exchanging communications between the user device and the base station that the user device is communicating through.

As shown by this view, sector 205 of cell 120 associated with base station 105 is facing sector 210 of cell 150 associated with base station 135. Sector 205 and sector 210 are facing because signals transmitted from base station 105 to sector 205 may transmit directly toward sector 210 and signals transmitted from base station 135 to sector 210 may transmit directly toward sector 205. Further, a portion of sector 205 overlaps sector 210 as shown in overlapping area 215. When user devices are within overlapping area 215, the user device may select either of sector 205 of cell 120 or sector 210 of cell 150 for connecting to the wireless communication network 100. The user device performs cell selection, not discussed in detail here, based on a number of factors including signal strength, available resources of the associated base station, and so forth.

Controller 165 includes performance data analysis 240 and dynamic assignment calculation 245. While shown as two modules for ease of description, the functionality of performance data analysis 240 and dynamic assignment calculation 245 may be included in any number of modules and may be implemented in hardware, firmware, software, or any combination. For example, a memory of controller 165 may include instructions that, when executed by a processor of controller 165, may perform the described functionality.

Performance data analysis 240 may include determining that sector 205 and sector 210 are facing sectors. In some embodiments, the facing sectors may be determined by controller 165 based on data received by controller 165 such as performance data from each base station 105 and base station 135, geographical data for each sector 205 and sector 210, locational data for each base station 105 and base station 135, or data that specifies sector 205 and sector 210 as facing (e.g., manually input). The determination may be made and stored so that controller 165 includes a listing of facing sectors, in some embodiments. Controller 165 may receive performance data and provide the performance data to performance data analysis 240 to analyze. The performance data may include interference measurements, dropped signal measurements, dropped call measurements, retransmission measurements, timing measurements, power measurements, and the like. The performance data may include measurements taken by each base station 105 and base station 135, by user devices within sector 205 reported to base station 105, by user devices within sector 210 reported to base station 135, or a combination. Controller 165 may receive the performance data from base station 105 and base station 135 based on requesting the data at a point in time, at regular intervals, continuously, or any combination. In some embodiments, controller 165 may store the performance data to analyze the performance data over time. For example, traffic patterns in the area, the number of device connected via each sector 205 and sector 210, physical obstacles, and the like may change at any given time of the day or day of the week. For example, more traffic may be present during rush hour than other times of the day. As another example, more user devices may be connected for longer time periods during the weekends than during weekdays. Performance data analysis 240 may analyze the stored data to identify trends, consistent behaviors, and the like in the performance data for each sector 205 and sector 210.

Dynamic assignment calculation 245 may calculate the assignment of the available resource blocks for each sector 205 and sector 210 based on the performance data to maximize allocation to user devices in each sector and minimize interference (i.e., maximize performance). Resource blocks are described in more detail with respect to FIGS. 5A and 5B. Each resource block is a given time (i.e., slot) in a frame and frequency (i.e., subcarrier) in a channel bandwidth that a base station allocates to a user device for communicating on the wireless communication network 100. When the user device knows which resource blocks are allocated to it, and the base station knows which resource blocks are allocated to each user device, the base station and the user device know which signals are associated with which user device based on the slot during the frame and the subcarrier frequency at which the signal was transmitted. As described with respect to FIG. 5A, as an example, a 3 MHz channel with a 10 ms frame length includes 300 resource blocks. Certain resource blocks are used only for configuration information and other signaling that is used to ensure the wireless communication network 100 operates properly, which leaves fewer than 300 resource blocks for allocation to the user devices in each cell.

As an example, assume there are 90 resource blocks available for allocation to user devices in the channel bandwidth. Cell 120 may utilize the 90 available resource blocks in each sector 205, sector 220, and sector 225 because they do not overlap or interfere with each other. Cell 150 may similarly utilize the 90 available resource blocks in each sector 210, sector 230, and sector 235 because they do not overlap or interfere with each other. However, because sector 205 and sector 210 face each other and overlap, interference is likely if both sectors allocate the same 90 resource blocks to their respective user devices. Note that while sector 205 and sector 210 are overlapping as shown in area 215, they need not be overlapping to be facing.

Dynamic assignment calculation 245 may receive the analysis of the performance data from performance data analysis 240 and determine, based on the analyzed performance data, the number of available resource blocks to assign to base station 105 for allocation in sector 205 and the number of available resource blocks to assign to base station 135 for allocation in sector 210. Once assignments are determined, controller 165 transmits the assigned resource blocks for sector 205 to base station 105 via backhaul link 125 and transmits the assigned resource blocks for sector 210 to base station 135 via backhaul link 155.

In some examples, the performance data may be current performance data, and dynamic assignment calculation 245 may assign the available resource blocks for sector 205 and sector 210 based on the current performance data. Returning to the example above of 90 available resource blocks, the available resource blocks may be divided between sector 205 and sector 210 in any way. For example, the first 30 resource blocks may be assigned to sector 205 and the last 30 resource blocks may be assigned to sector 210, leaving the middle 30 resource blocks unused. As another example, the first 45 resource blocks may be assigned to sector 205 and the second 45 resource blocks may be assigned to sector 210, ensuring all resource blocks are assigned to a sector. As yet another example, no resource blocks may be assigned to sector 205 and all 90 resource blocks may be assigned to sector 210. In yet another example, the first 60 resource blocks may be assigned to sector 205 and the last 60 resource blocks may be assigned to sector 210, such that the middle 30 resource blocks may be assigned to both sector 205 and sector 210. Accordingly, any combination of assignments of the available resource blocks may be assigned to the facing sectors.

Some examples of variation of the resource block assignment may include, more user devices in one sector than the other, better performance in one sector than the other, more volatility (e.g., handovers) in one sector than the other, and so forth.

In some embodiments, dynamic assignment calculation 245 may receive the analyzed performance data and perform a calculation that determines, for example, the number of resource blocks to assign to each sector 205 and sector 210 to accommodate a number of user devices in each sector 205 and sector 210 as well as account for a threshold level of performance in each sector 205 and sector 210. In some embodiments, dynamic assignment calculation 245 may be a tuning system that continuously receives updated performance analysis from performance data analysis 240 and continuously updates the dynamic assignments until a threshold performance of each sector 205 and sector 210 is achieved. In some embodiments, dynamic assignment calculation 245 may use a machine learning algorithm that receives the analysis of the performance data from performance data analysis 240 and determines the optimal dynamic assignment of resource blocks.

In some embodiments, dynamic assignment calculation 245 may receive analyzed performance data that has been analyzed over time. Over time, as trends and behaviors may be identified, dynamic assignment calculation 245 may identify dynamic assignments of the available resource blocks for each sector 205 and sector 210 and associate the dynamic assignments with temporal designations. For example, during rush hour on weekdays a first dynamic assignment for each sector 205 and sector 210 may be determined, and during Sunday mornings a different dynamic assignment for each sector 205 and sector 210 may be determined. Dynamic assignment calculation 245 may store the determined dynamic assignments associated with the temporal designation in a memory of controller 165. At the temporal designations, dynamic assignment calculation 245 may dynamically assign the stored dynamic assignments associated with the temporal designation to each base station 105 for sector 205 and base station 135 for sector 210. Further, in some embodiments, dynamic assignment calculation 245 may retrieve the stored dynamic assignments, receive analysis of current performance data from performance data analysis 240, and adjust the dynamic assignment for each sector 205 and sector 210 at the temporal designation based on the current performance. The controller may then transmit the dynamic assignment for sector 205 to base station 105 via backhaul link 125 and the dynamic assignment for sector 210 to base station 135 via backhaul link 155.

Figure 3:
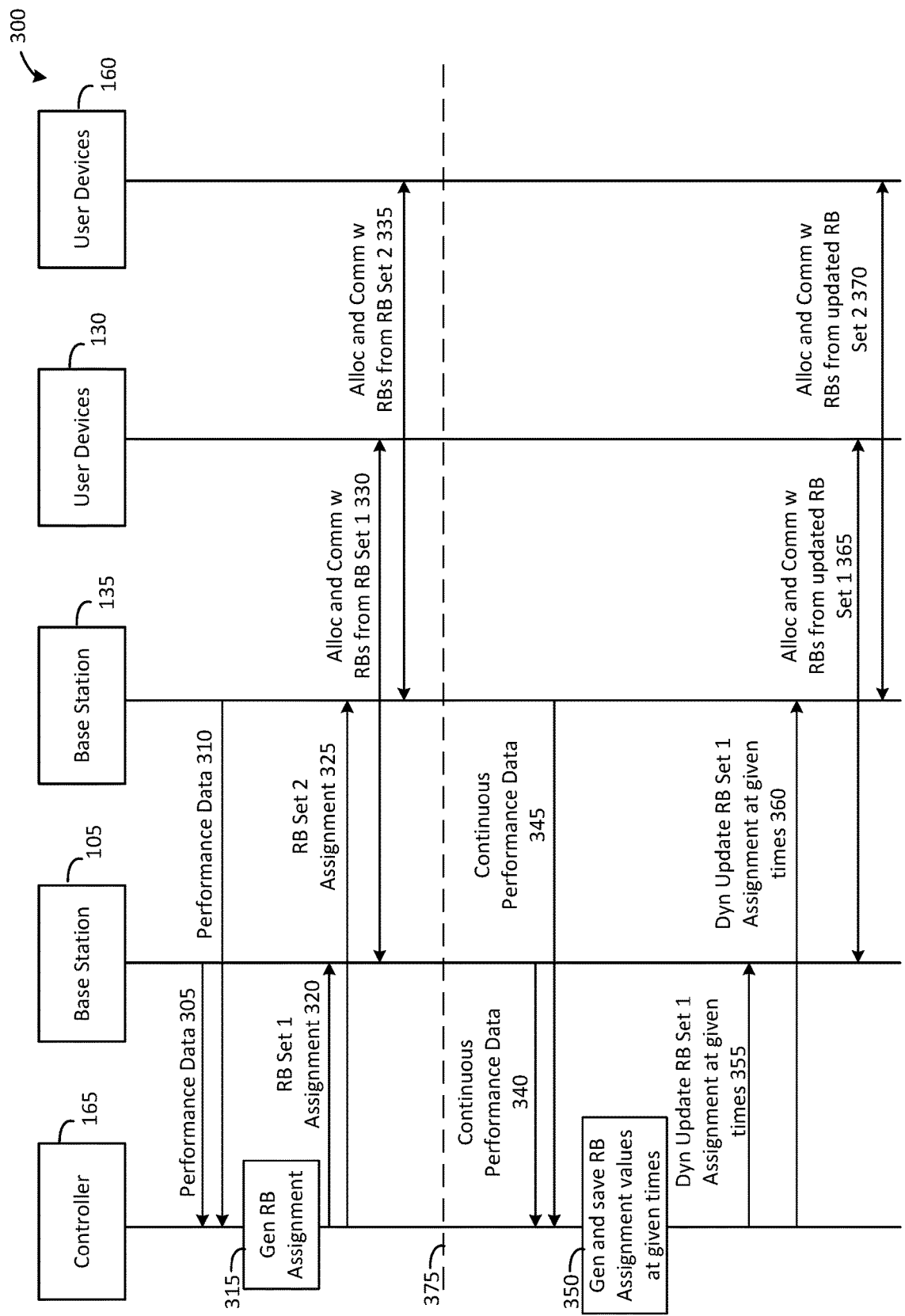
FIG. 3 illustrates a swim diagram showing flow of data within the wireless communication network of FIG. 1, according to some embodiments.

FIG. 3 illustrates a swim diagram 300 for communications between the various components of wireless communication network 100. Initially, base station 105 transmits performance data to controller 165 at 305. Base station 135 also transmits performance data to controller 165 at 310. Controller 165 generates resource block assignments for the facing sectors (sector 205 and sector 210) at 315. The resource block assignment is generated using performance data analysis 240 and dynamic assignment calculation 245 as described previously with respect to FIG. 2. Controller 165 transmits the resource block first set assignment to base station 105 for use by sector 205 at 320. Controller 165 transmits the resource block second set assignment to base station 135 for use by sector 210 at 325. Base station 105 allocates some resource blocks from the first set to user devices 130 in sector 205 and exchanges signals with the user devices 130 using the allocated resource blocks at 330. Base station 135 allocates some resource blocks from the second set to user devices 160 in sector 210 and exchanges signals with the user devices 160 using the allocated resource blocks at 335. Advantageously, the resource block assignments and allocation maximize allocation to user devices within each facing sector and minimizes interference (i.e., maximizes performance) for each sector 205 and sector 210.

Over time, as shown by threshold line 375, base station 105 continuously provides performance data to controller 165 at 340. Similarly, base station 135 continuously provides performance data to controller 165 at 345. Controller 165 generates and saves resource block assignment values associated with given times (i.e., temporal designations). Temporal designations may indicate a time of day, day of week, week of month, month of year, or any combination. At given stored temporal designations, controller 165 may access the stored dynamic assignments associated with the given temporal designation and dynamically update the resource block first set assignment by transmitting the update at the temporal designation to base station 105 at 355. Controller 165 may also dynamically update the resource block second set assignment by transmitting the update at the temporal designation to base station 135 at 360. During the update, as discussed above, dynamic assignment calculation 245 may utilize current performance data to adjust the stored dynamic assignments and update the dynamic assignments using the adjusted dynamic assignments. Base station 105 may allocate resource blocks from the updated resource block first set to user devices 130 in sector 205 and exchange signals using the allocated resource blocks at 365. Base station 135 may allocate resource blocks from the updated resource block second set to user devices 160 in sector 210 and exchange signals using the allocated resource blocks at 370.

Figure 4:
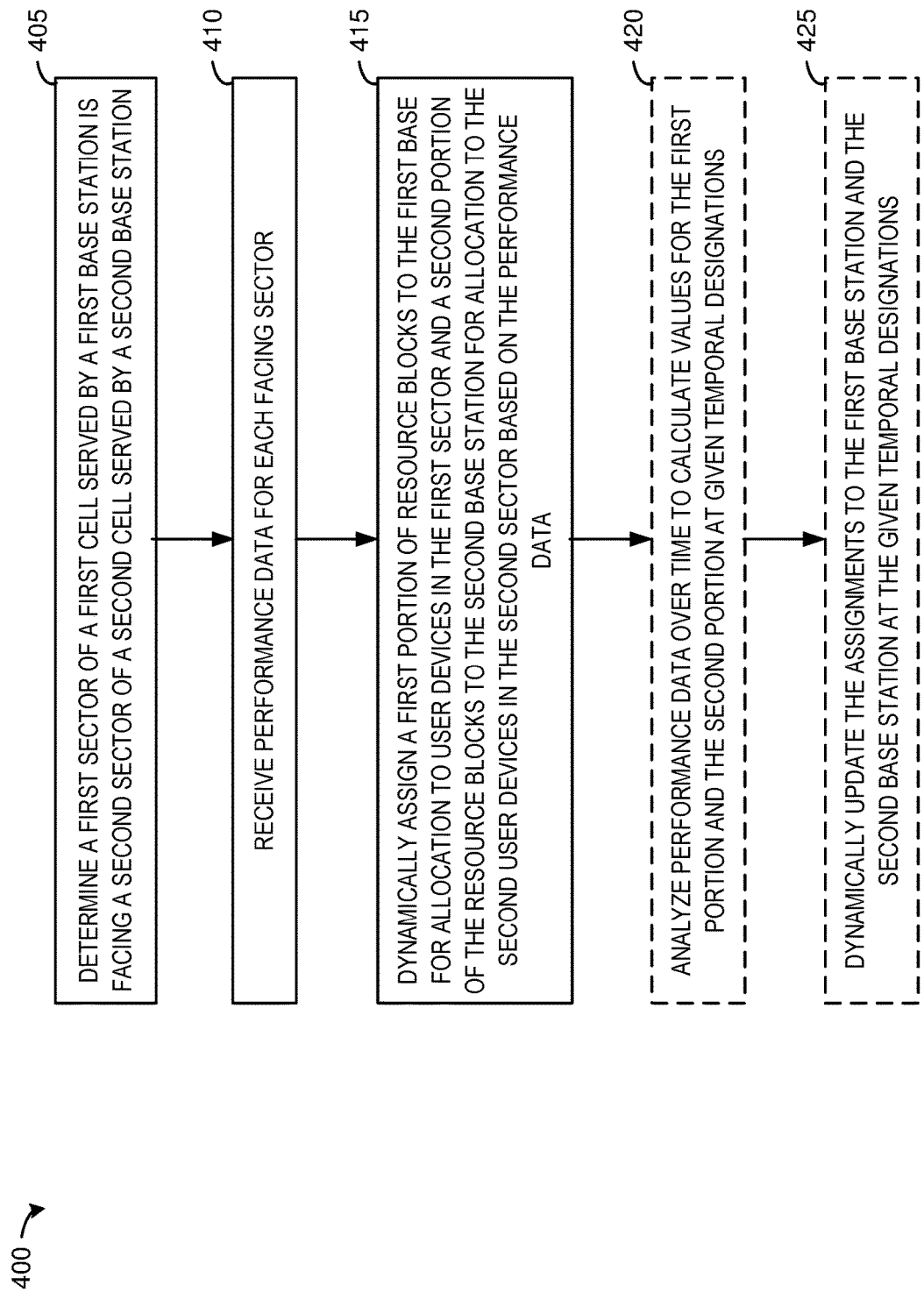
FIG. 4 illustrates a method for dynamically allocating resource blocks to facing sectors, according to some embodiments.

FIG. 4 illustrates an exemplary method 400 for dynamically assigning resource blocks to facing sectors. Method 400 may be performed, for example, in wireless communication network 100 by controller 165. Method 400 begins at 405 with the controller determining a first sector of a first cell served by a first base station is facing a second sector of a second cell served by a second base station. For example, controller 165 may use performance data analysis 240 to determine sector 205 of base station 105 is facing sector 210 of base station 135. As another example, sector 205 and sector 210 may be manually designated as facing and the information stored in controller 165. Controller 165 may find the stored designation to determine the sectors are facing, in some embodiments.

At 410, the controller receives performance data for each facing sector. For example, controller 165 may receive performance data from base station 105 via backhaul link 125 and performance data from base station 135 via backhaul link 155. The performance data may include, for example, interference measurements, dropped signal measurements, dropped call measurements, retransmission measurements, timing measurements, power measurements, and the like. The performance data may include measurements taken by each base station 105 and base station 135, by user devices within sector 205 reported to base station 105, by user devices within sector 210 reported to base station 135, or a combination.

At 415, the controller may dynamically assign a first portion of resource blocks to the first base station for allocation to user devices in the first sector and a second portion of the resource blocks to the second base station for allocation to the second user devices in the second sector based on the performance data. For example, performance data analysis 240 may analyze the performance data, and dynamic assignment calculation 245 may calculate the assignment of a portion of the available resource blocks to base station 105 for allocation to user devices 130 in sector 205 and the assignment of another portion of the available resource blocks to base station 135 for allocation to user devices 160 in sector 210. As described above, the first portion assigned to the first base station may be exclusive of the second portion assigned to the second base station, or the first portion may overlap the second portion. Additionally, any number of the available resource blocks may be in the first portion and any number of the available resource blocks may be in the second portion. The determination of the assignment is based on performance data associated with each of the facing sectors including the number of user devices in each sector, interference data, timing data, and the like. The optimal assignment is such that the dynamic assignment of portions of available resource blocks maximizes allocation to the user devices in each of the facing sectors and minimizes interference in each of the facing sectors (i.e., maximizes performance for each of the facing sectors).

Figure 5A:
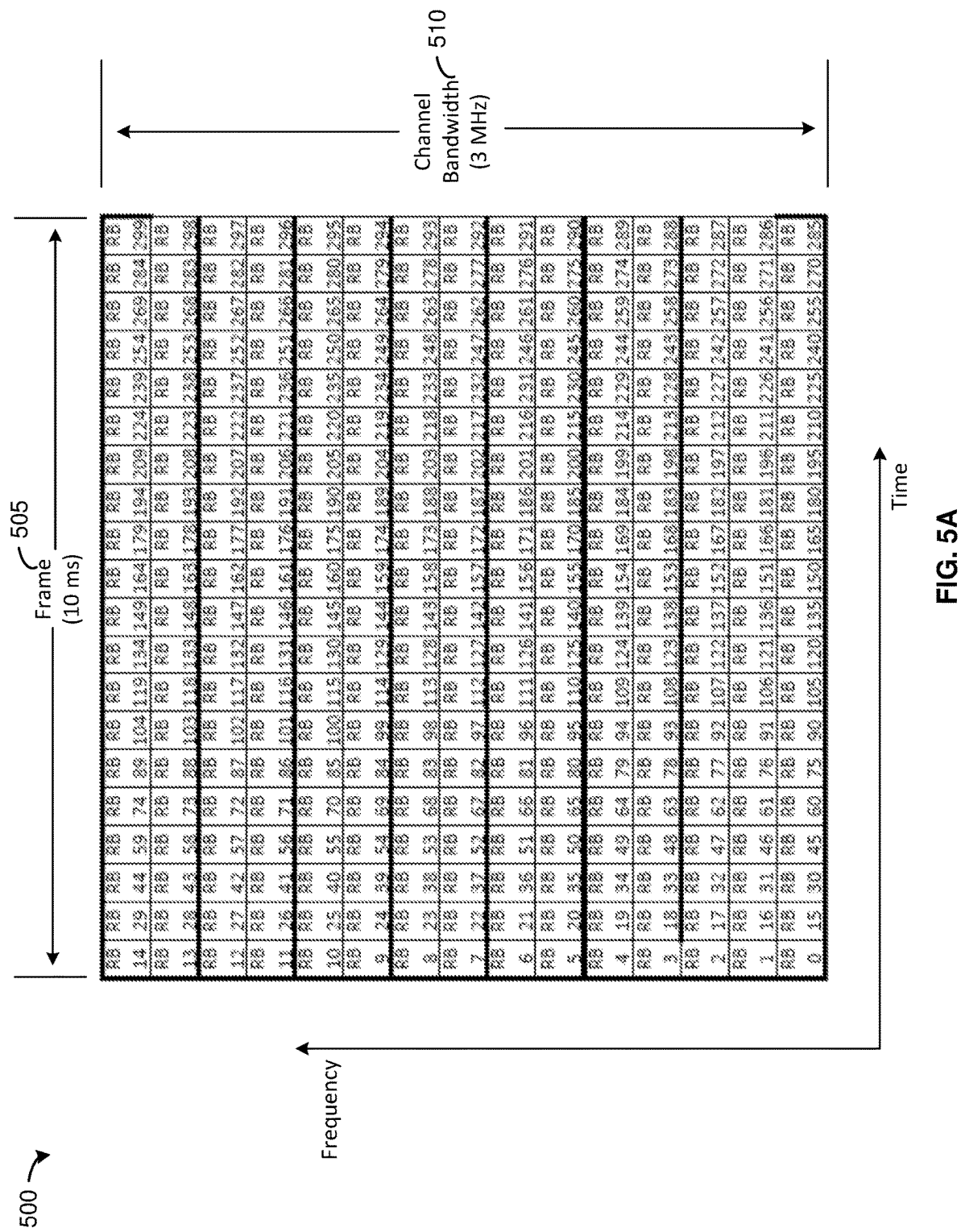
FIG. 5A illustrates a frame and channel of resource blocks, according to some embodiments.

FIG. 5A illustrates an example set of resource blocks 500 for a given frame 505 and channel bandwidth 510. The horizontal axis depicts time and the vertical axis depicts frequency. As an example, the frame length is 10 milliseconds (ms) and the channel bandwidth is 3 MegaHertz (MHz). Channel bandwidth is the width of the channel as measured from the lowest channel edge to the highest channel edge. In this example, each frame has 10 subframes of 1 ms and each subframe includes two slots of 0.5 ms each. A resource block is one slot in length. In this example, each resource block is 180 kiloHertz (kHz) in frequency, and there are 15 resource blocks in the channel. 300 kHz of frequency is reserved and not included in the resource blocks. A base station may allocate a number of resource blocks to each user device to allow the user device to use the allocated resource blocks to communicate in each frame with its associated base station. A given base station may allocate resource blocks to the user devices it serves to avoid interference between each other. While example values are used for ease of description, a frame may be any length, a channel bandwidth may cover any range of frequencies, and the number of resource blocks may be different in various deployments of wireless communication networks.

Figure 5B:
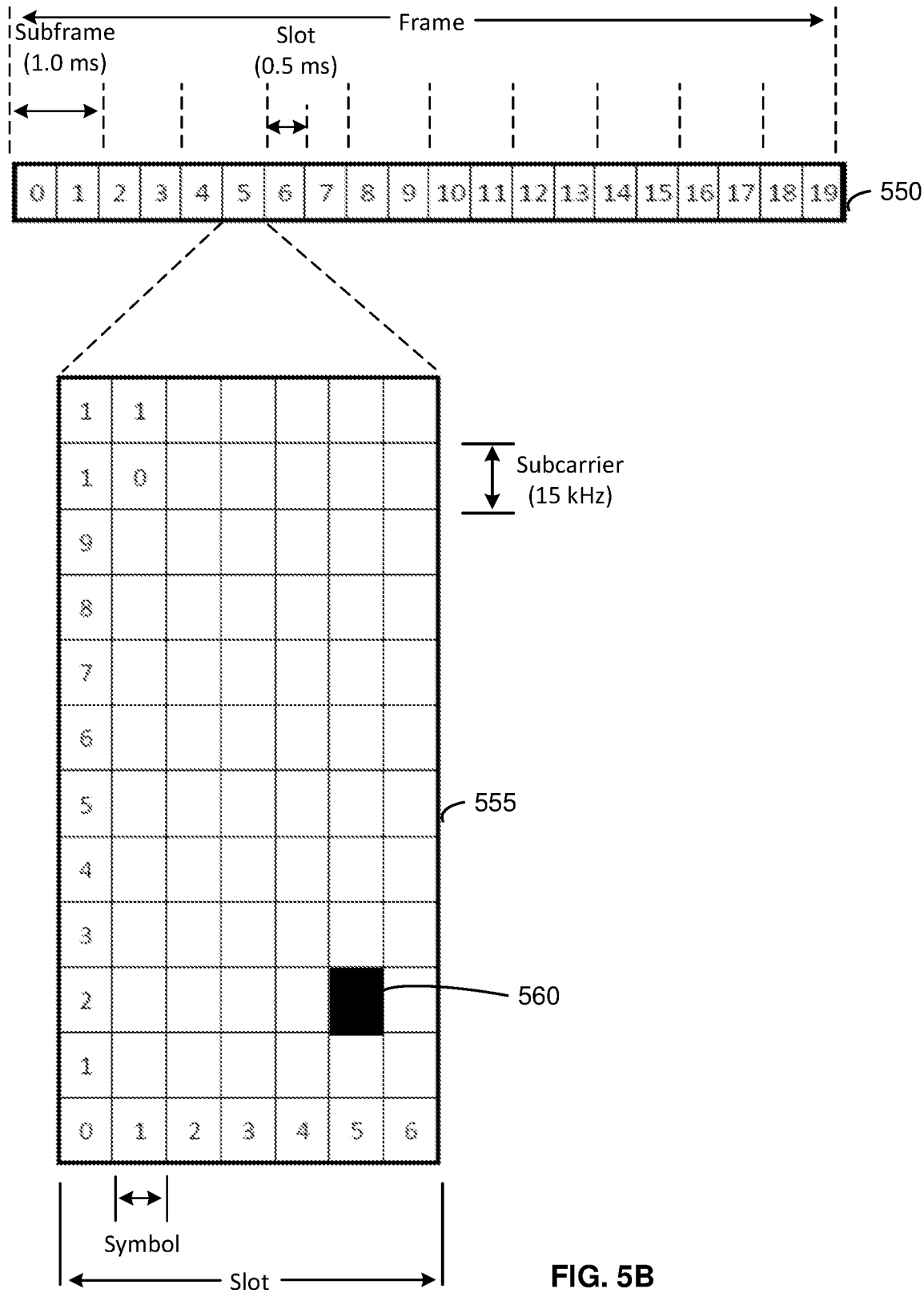
FIG. 5B illustrates a more detailed view of a resource block, according to some embodiments.

FIG. 5B illustrates an example single subcarrier frame 550 and zoomed view of an example single resource block 555. As shown in this example, the Frame 550 is 10 ms in duration. There are 10 subframes of 1 ms each in each frame 550, and each subframe includes two 0.5 ms slots. A resource block 555 is one slot in duration. A resource element 560 is one symbol in duration and is, in this example, includes a 15 kHz subcarrier. Each resource block includes 12 subcarrier frequencies in this example (180 kHz) and has normal cyclic prefix so there are 7 symbols in each slot. Accordingly, a symbol is 0.5/7 ms in length.

Figure 6:
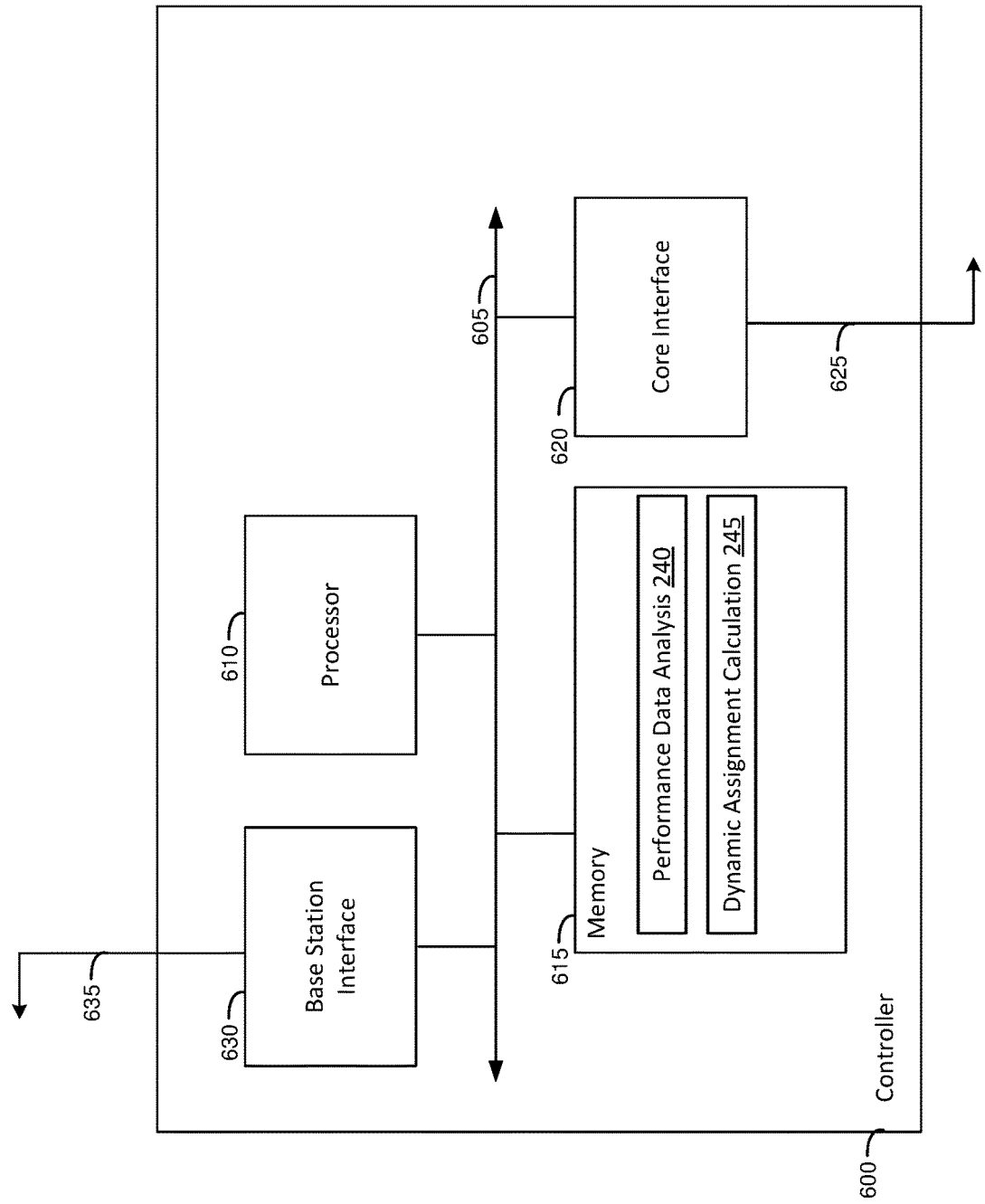
FIG. 6 illustrates a controller, according to some embodiments.

FIG. 6 illustrates an exemplary controller 600. Controller 600 may be controller 165 described with respect to FIG. 1. Controller 600 may include bus 605, processor 610, memory 615, core interface 620, and base station interface 630. Controller 600 may include other components not described here for simplicity. For example, controller 600 may include input and output components such as a keyboard, mouse, and display as well as other software, firmware, and hardware that may be used to perform other functions not described with respect to this disclosure. Controller 600 may perform method 400 as described above.

Controller 600 includes bus 605 that electrically couples hardware components within controller 600 to facilitate communication between the hardware components. The hardware components include processor 610, memory 615, core interface 620, and base station interface 630. Processor 610 may include one or more processors including general-purpose processors, special-purpose processors (e.g., digital signal processor chips (DSPs), graphics acceleration processors, application specific integrated circuits (ASICs), and/or the like.

Memory 615 may include performance data analysis 240 and dynamic assignment calculation 245 as described above with respect to FIG. 2. Specifically, performance data analysis 240 and dynamic assignment calculation 245 may include instructions stored in memory 615 that are executed by processor 610 to perform the functionality described in detail above to, for example, perform method 400. Memory 615 may also include software like operating systems, user applications, radio applications, and network functions. Memory 615 may include local storage, network accessible storage, a disk drive, a drive array, an optical storage device, a solid-state storage device such as random-access memory (RAM) or read-only memory (ROM), programmable memory, flash-updateable, volatile, non-volatile, or any combination thereof. Memory 615 may store data in various structures including file systems, database structures, or the like.

Base station interface 630 may be a network interface that includes support of communication technologies for communicating on backhaul link 635 with base stations (e.g., base station 105 and base station 135. Backhaul link 635 may include backhaul link 125 and backhaul link 155.

Core interface 620 may be a network interface that includes support of communication technologies for communicating on backhaul link 625 with a core (e.g., core 175 of wireless communication network 100). Backhaul link 625 may include backhaul link 170.

Figure 7:
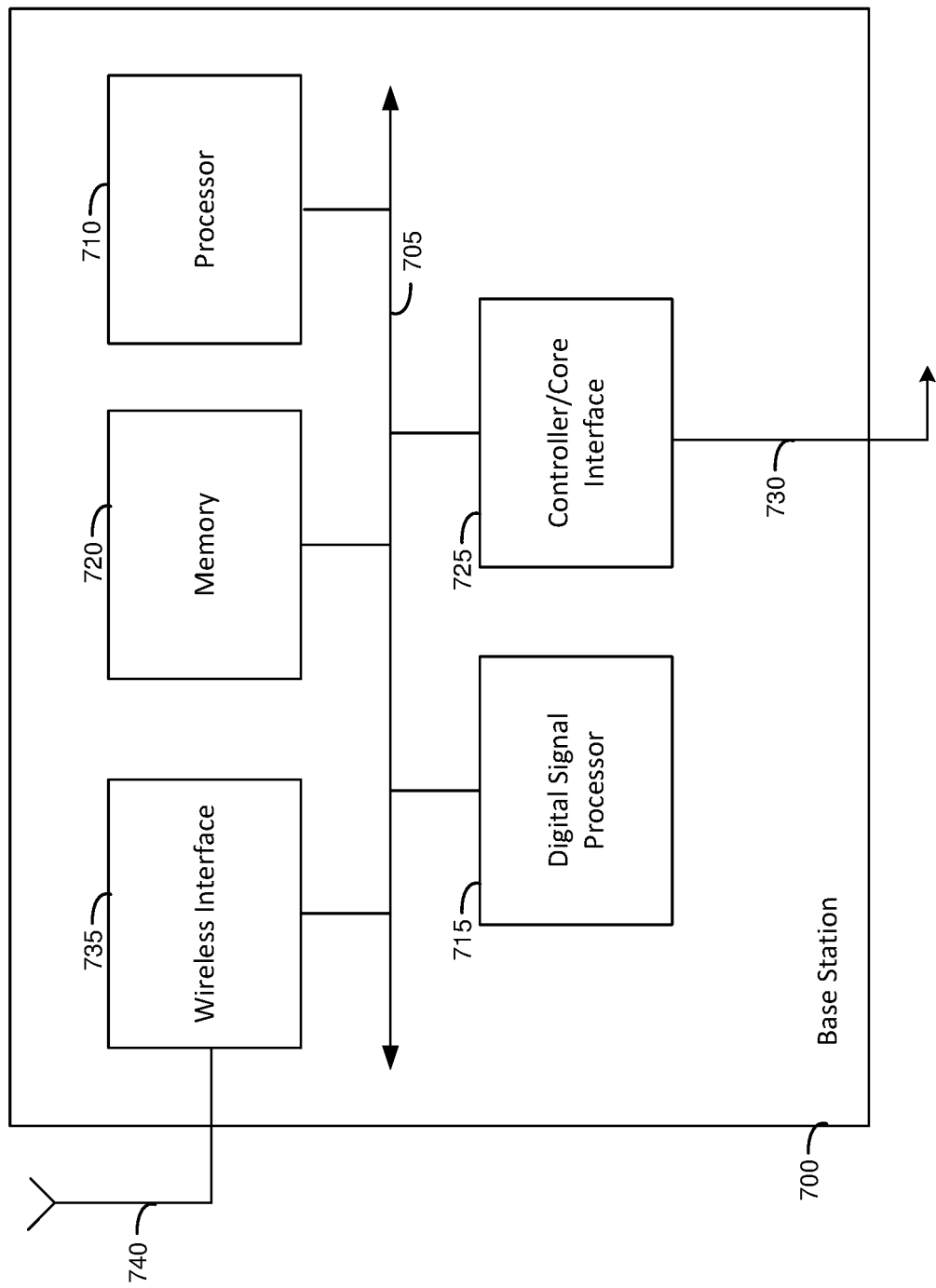
FIG. 7 illustrates a base station, according to some embodiments.

FIG. 7 illustrates an exemplary base station 700. Base station 700 may be base station 105 or base station 135 described with respect to FIG. 1. Base station 700 may include bus 705, processor 710, digital signal processor 715, memory 720, controller/core interface 725, and wireless interface 735. Base station 700 may include other components not described here for simplicity. For example, base station 700 may include input and output components such as a keyboard, mouse, and display as well as other software, firmware, and hardware that may be used to perform other functions not described with respect to this disclosure. Base station 700 may serve user devices in its cell to facilitate the user devices' access to a wireless communication network.

Base station 700 includes bus 705 that electrically couples hardware components within base station 700 to facilitate communication between the hardware components. The hardware components include processor 710, digital signal processor 715, memory 720, controller/core interface 725, and wireless interface 735. Processor 710 may include one or more processors including general-purpose processors, special-purpose processors (e.g., digital signal processor chips (DSPs), graphics acceleration processors, application specific integrated circuits (ASICs), and/or the like. Base station 700 may further include a separate digital signal processor 715.

Memory 720 may include software like operating systems, user applications, radio applications, and network functions. The software instructions may be executed by processor 710 to perform functionality. Memory 720 may further include signal data that may be processed by digital signal processor 715. Memory 720 may include local storage, network accessible storage, a disk drive, a drive array, an optical storage device, a solid-state storage device such as random-access memory (RAM) or read-only memory (ROM), programmable memory, flash-updateable, volatile, non-volatile, or any combination thereof. Memory 720 may store data in various structures including file systems, database structures, or the like.

Controller/core interface 725 may be a network interface that includes support of communication technologies for communicating on backhaul link 730 with a controller, a core, or a combination (e.g., controller 165 and core 175 of wireless communication network 100). Backhaul link 730 may be the same as backhaul link 125 and backhaul link 155.

Wireless interface 735 may include a modem, a network card, an infrared communication device, a wireless communication device, a chipset, or the like, or a combination thereof. Wireless interface 735 may enable base station 700 to communicate wirelessly with other devices including other base stations, user devices, other network devices, or a combination thereof. The signals may be exchanged via antenna 740. Antenna 740 may include one or more antenna. Wireless interface 735, including antenna 740, may be the same as transceiver 110 and transceiver 140.

While some examples provided herein are described in the context of a controller and facing sectors of base stations, it should be understood that the systems and methods described herein are not limited to such embodiments and may apply to a variety of other wireless communication network environments and their associated systems. As will be appreciated by one skilled in the art, aspects of the present invention may be embodied as a system, method, computer program product, and other configurable systems. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The phrases "in some embodiments," "according to some embodiments," "in the embodiments shown," "in other embodiments," and the like generally mean the particular feature, structure, or characteristic following the phrase is included in at least one implementation of the present technology and may be included in more than one implementation. In addition, such phrases do not necessarily refer to the same embodiments or different embodiments.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for" but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A system, comprising:
   a first base station serving first user devices in a first cell comprising a first set of sectors;
   a second base station serving second user devices in a second cell comprising a second set of sectors; and
   a controller comprising:
      one or more processors, and
      a memory having stored thereon instructions that, upon execution by the one or more processors, cause the one or more processors to:
         determine a first sector of the first set of sectors is facing a second sector of the second set of sectors;
         receive first performance data for the first sector from the first base station;
         receive second performance data for the second sector from the second base station;
         analyze the first performance data and the second performance data over time to calculate assignment values for a first portion of a plurality of resource blocks and assignment values for a second portion of the plurality of resource blocks at given temporal designations;
         store the assignment values for the first portion and the assignment values for the second portion associated with the given temporal designations; and
         dynamically assign the assignment values for the first portion of the plurality of resource blocks to the first base station for allocation to the first user devices in the first sector and the assignment values for the second portion of the plurality of resource blocks to the second base station for allocation to the second user devices in the second sector at the given temporal designations based at least in part on the first performance data and the second performance data.

2. The system of claim 1, wherein the instructions to dynamically assign further comprise instructions that, upon execution by the one or more processors, cause the one or more processors to:
   calculate the first portion of the plurality of resource blocks and the second portion of the plurality of resource blocks to:
      maximize allocation of the plurality of resource blocks to the first user devices and the second user devices, and
      minimize interference in the first sector and the second sector.

3. The system of claim 1, wherein the first performance data and the second performance data is continuously received, and wherein the dynamic assignment is updated continuously based on the continuously received first performance data and the continuously received second performance data.

4. The system of claim 1, wherein the instructions comprise further instructions that, upon execution by the one or more processors, cause the one or more processors to:
   continuously receive the first performance data; and
   continuously receive the second performance data.

5. The system of claim 4, wherein the instructions comprise further instructions that, upon execution by the one or more processors, cause the one or more processors to:
   at a first given temporal designation of the given temporal designations:
      retrieve the assignment values for the first portion and the assignment values for the second portion associated with the first given temporal designation;
      receive first current performance data for the first sector from the first base station;
      receive second current performance data for the second sector from the second base station;
      adjust the assignment values for the first portion and the assignment values for the second portion associated with the first given temporal designation based on the first current performance data and the second current performance data; and
      dynamically assign the adjusted assignment values for the first portion to the first base station and the adjusted assignment values for the second portion to the second base station.

6. The system of claim 1, wherein the first portion of the plurality of resource blocks does not overlap the second portion of the plurality of resource blocks.

7. The system of claim 1, wherein the first portion of the plurality of resource blocks overlaps the second portion of the plurality of resource blocks.

8. The system of claim 1, wherein the first performance data and the second performance data comprises interference measurements, power measurements, timing measurements, or a combination thereof.

9. The system of claim 1, wherein the first base station comprises:
   a processor;
   memory having stored thereon instructions that, upon execution by the processor, cause the processor to:
      receive the assignment of the first portion of the plurality of resource blocks, and
      allocate a first set of the first portion of the plurality of resource blocks to a first user device of the first user devices located in the first sector; and
   a wireless transceiver that exchanges signals with the first user device using the first set of resource blocks based on the allocating.

10. A method, comprising:
   determining a first sector of a first cell served by a first base station is facing a second sector of a second cell served by a second base station;
   receiving first performance data for the first sector from the first base station;
   receiving second performance data for the second sector from the second base station;
   analyzing the first performance data and the second performance data over time to calculate assignment values for a first portion of a plurality of resource blocks and assignment values for a second portion of the plurality of resource blocks at given temporal designations;
   storing the assignment values for the first portion and the assignment values for the second portion associated with the given temporal designations; and dynamically assigning the assignment values for the first portion of the plurality of resource blocks to the first base station for allocation to first user devices in the first sector and the assignment values for the second portion of the plurality of resource blocks to the second base station for allocation to second user devices in the second sector at the given temporal designations based at least in part on the first performance data and the second performance data.

11. The method of claim 10, further comprising:
calculating the first portion of the plurality of resource blocks and the second portion of the plurality of resource blocks to:
maximize allocation of the plurality of resource blocks to the first user devices and the second user devices, maximize the first performance data, and
maximize the second performance data.

12. The method of claim 10, wherein the first performance data and the second performance data is continuously received, and wherein the dynamic assignment is updated continuously based on the continuously received first performance data and the continuously received second performance data.

13. The method of claim 10, wherein:
receiving the first performance data comprises continuously receiving the first performance data; and
receiving the second performance data comprises continuously receiving the second performance data.

14. The method of claim 13, further comprising:
at a first given temporal designation of the given temporal designations:
retrieving the assignment values for the first portion and the assignment values for the second portion associated with the first given temporal designation;
receiving first current performance data for the first sector from the first base station;
receiving second current performance data for the second sector from the second base station;
adjusting the assignment values for the first portion and the assignment values for the second portion associated with the first given temporal designation based on the first current performance data and the second current performance data; and
dynamically assigning the adjusted assignment values for the first portion to the first base station and the adjusted assignment values for the second portion to the second base station.

15. The method of claim 10, wherein the first portion of the plurality of resource blocks does not overlap the second portion of the plurality of resource blocks.

16. The method of claim 10, wherein the first portion of the plurality of resource blocks overlaps the second portion of the plurality of resource blocks.

17. The method of claim 10, wherein the first performance data and the second performance data comprises interference measurements, power measurements, timing measurements, or a combination thereof.

18. The method of claim 10, further comprising:
receiving, by the first base station, the assignment of the first portion of the plurality of resource blocks;
allocating, by the first base station, a first set of the first portion of the plurality of resource blocks to a first user device of the first user devices located in the first sector; and
exchanging, by the first base station, signals with the first user device using the first set of resource blocks.

19. A computer-readable media having stored thereon instructions that, upon execution by one or more processors, cause the one or more processors to:
determine a first sector of a first cell served by a first base station is facing a second sector of a second cell served by a second base station;
receive first performance data for the first sector from the first base station;
receive second performance data for the second sector from the second base station;
analyze the first performance data and the second performance data over time to calculate assignment values for a first portion of a plurality of resource blocks and assignment values for a second portion of the plurality of resource blocks at given temporal designations;
store the assignment values for the first portion and the assignment values for the second portion associated with the given temporal designations; and
dynamically assign the assignment values for the first portion of the plurality of resource blocks to the first base station for allocation to first user devices in the first sector and the assignment values for the second portion of the plurality of resource blocks to the second base station for allocation to second user devices in the second sector at the given temporal designations based at least in part on the first performance data and the second performance data.

20. The computer-readable media of claim 19, wherein the instructions to dynamically assign further comprise instructions that, upon execution by the one or more processors, cause the one or more processors to:
calculate the first portion of the plurality of resource blocks and the second portion of the plurality of resource blocks to:
maximize allocation of the plurality of resource blocks to the first user devices and the second user devices, and
minimize interference in the first sector and the second sector.

* * * * *